Figure 1:
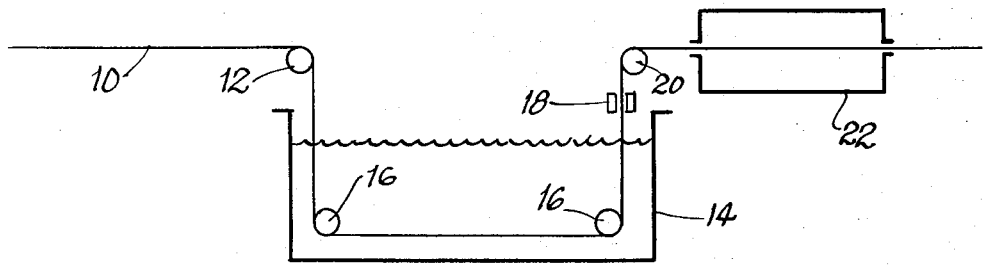

United States Patent [19]
Uffner

[11] 3,826,074
[45] July 30, 1974

[54] GLASS FIBER REINFORCED ELASTOMERS

[75] Inventor: William E. Uffner, Newark, Ohio

[73] Assignee: Owens-Corning Fiberglas Corporation, Toledo, Ohio

[22] Filed: Mar. 1, 1972

[21] Appl. No.: 230,724

[52] U.S. Cl................ 57/140 G, 57/153, 117/72, 117/126 GB, 161/140, 161/143, 161/170, 161/176, 161/192, 161/198, 161/202, 161/203, 161/234, 161/255, 161/257, 260/28, 260/28.5 D, 260/29.3, 260/845, 260/846, 260/847

[51] Int. Cl....... B32b 3/18, B29h 17/28, C08d 9/10

[58] Field of Search....... 161/143, 109, 70, 76, 170, 161/176; 117/161, 168, 124, 72, 126 GB; 260/28.5, 28, 846; 57/140 G, 153

[56] References Cited
UNITED STATES PATENTS 3,567,671   3/1971   Janetos et al................ 260/28.5 D Primary Examiner—George F. Lesmes
Assistant Examiner—Charles E. Lipsey
Attorney, Agent, or Firm—Staelin & Overman

[57] ABSTRACT

This invention is addressed to the treatment of glass fibers for use as reinforcement with elastomeric materials, and particular compositions used in the treatment of glass fibers, wherein the composition contains a resorcinol-aldehyde resin, an incompatible wax and a graft polymer formed of a monomer of vinyl chloride, vinylidene chloride, chloroprene and combinations thereof grafted onto a vinyl pyridine-butadiene-styrene terpolymer backbone.

23 Claims, 3 Drawing Figures

PATENTED JUL 30 1974 3,826,074

GLASS FIBER REINFORCED ELASTOMERS

This invention relates to glass fiber-elastomeric products, and more particularly to the treatment of glass fibers and compositions in the treatment of glass to facilitate the combination of glass fibers with elastomeric materials such as the manufacture of glass fiber-reinforced elastomeric products.

The term "glass fibers," as used herein, is intended to refer to and include (1) continuous fibers formed by the rapid attenuation of hundreds of streams of molten glass and to strands formed with such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from a glass melting bushing and to yarns that are formed when such discontinuous fibers are gathered together to form a sliver which is drafted into a yarn; and to woven and non-woven fabrics formed of such yarns of discontinuous fibers, and (3) combinations of such continuous and discontinuous fibers in strands, yarns, cords and fabrics formed thereof.

As used herein, the term "elastomer" is intended to mean and include natural rubber in the cured or uncured stage, vulcanized or unvulcanized stage, and synthetic organic elastomeric materials such as nitriles, acrylics and esters and terpolymers thereof with styrene and acrylonitriles; styrene and vinyl pyridine; and synthetic rubbers as represented by butadiene polymers and copolymers with monoolefins such as butadiene-styrene copolymer, butadiene-acrylonitrile copolymers, butadiene-styrene vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from three–20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from two–12 carbon atoms, and polysulfone rubbers.

It is well known to combine glass fibers with elastomeric materials in the manufacture of glass fiber-reinforced elastomeric products, such as driving belts, timing belts, pneumatic tires, etc. One of the problems which has been encountered in such combinations of glass fibers with elastomeric products is the problem of securely anchoring the glass fiber surfaces to the elastomeric material in which the glass fibers are distributed. It is believed that this problem stems in part from the fact that the glass fibers are completely smooth, rod-like members and in part from the fact that the glass fiber surfaces are highly hydrophilic in nature, thereby resulting in the formation of a thin but tenacious film of moisture on the glass fiber surfaces which serves to destroy any bonds, chemical or physical, which would otherwise be formed between the glass fiber surfaces and the elastomeric material with which the glass fibers are combined.

To minimize the problems of binding the glass fiber surfaces to the elastomeric materials, it has been the practice in the manufacture of glass fiber-reinforced elastomeric products to make use of glass fibers in the form of individual glass fibers having a coating on the surfaces thereof to intertie the individual glass fibers to the elastomeric material in which the glass fibers are distributed, or preferably glass fibers in the form of yarns, cords or fabrics, hereinafter referred to as bundles, containing an impregnant therein which also serves to intertie the glass fiber bundles to the elastomeric material in which the bundles are distributed.

One such composition which can be effectively used in the treatment of individual glass fibers or bundles of glass fibers to enhance the bonding relationship between glass fibers and elastomeric materials as outlined above is described in U.S. Pat. No. 3,567,671, in which description is made of a treating composition formulated to include a resorcinol-aldehyde resin, a vinyl pyridine-butadiene-styrene terpolymer, a latex component in the form of a copolymer of vinyl chloride and vinylidene chloride and an incompatible wax. While the composition described in this patent represents a significant advance in the treatment of glass fibers, it has been found that the bonding relationship between glass fibers and elastomeric materials can be further improved by the use of a copolymer of vinylidene chloride and at least one other vinyl monomer which contains at least 60 percent by weight vinylidene chloride.

Without limitation as to theory, it is believed that the improved bonding and adhesion provided by the foregoing systems is at least due to the ability of the chlorinated component to undergo a series of complex free radical reactions which lead to cross-linking on cure or vulcanization of the treated glass fibers in combination with elastomeric materials.

While the systems described provide excellent adhesion and performance characteristics when used in the treatment of glass fibers in the manufacture of glass fiber reinforced elastomeric products, it is sometimes desirable to make use of more simplified systems which are cleaner to use and which are capable of providing treated glass fibers having comparable adhesion and performance characteristics.

It is accordingly an object of the invention to provide an improved composition for use in the treatment of individual glass fibers, or preferably bundles of glass fibers, to promote the bonding relationship between glass fibers and elastomeric materials in the manufacture of glass fiber reinforced elastomeric products.

It is a more specific object of the present invention to provide a composition for use in the treatment of glass fibers in which the composition is formed of a simplified system which is capable of cleaner use and yet is capable of providing comparable adhesion and performance characteristics.

It is a related object of the invention to provide coated glass fibers and impregnated bundles of glass fibers which have been treated with compositions embodying the concepts of the invention.

Figure 2:
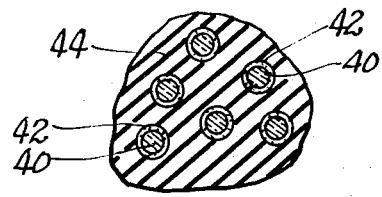
Figure 3:
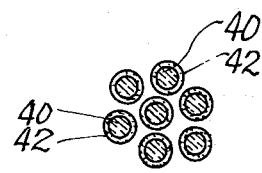

These and other objects and advantages of the invention will appear more fully hereinafter and, for purposes of illustration and not of limitation, an embodiment of the invention is shown in the accompanying drawing in which FIG. 1 is a schematic flow diagram illustrating one method for impregnation of a bundle of glass fibers in accordance with the preferred practice of the invention;

FIG. 2 is a sectional view of a bundle of glass fibers treated in accordance with the flow diagram of FIG. 1; and FIG. 3 is a cross-sectional view of fibers individually coated with the composition of the invention in accordance with another embodiment of the invention.

The concepts of the present invention reside in an improved treating composition which is formulated to include, as the essential ingredients, a resorcinol-aldehyde resin, an incompatible wax and a graft polymer formed of a vinyl pyridine-butadiene-styrene terpolymer backbone which is grafted with one or more monomers selected from the group consisting of vinyl chloride, vinylidene chloride or chloroprene.

It has surprisingly been found that the foregoing graft terpolymer can be effectively used in place of the vinyl pyridine-butadiene-styrene latex and the vinyl chloride or vinylidene chloride copolymers described in U.S. Pat. No. 3,567,671 or the above copending application to provide a less complex system which operates with less scum formation in the treating bath and which provides heated glass fibers having comparable adhesion and performance characteristics as glass fibers treated with the more complex systems.

It is unexpected that such graft polymers are capable of providing comparable results with systems formulated to include separated vinyl pyridine-butadiene-styrene terpolymer and vinyl chloride and/or vinylidene chloride polymer components because the chlorinated component of the graft polymer is grafted onto the backbone. In addition, there is generally less of a total chlorine content in the graft polymer system as compared to the system formulated to contain separate components. Consequently, it is surprising that the limited chlorine content of the graft polymer system is capable of undergoing the complex free radical reactions which are believed to result in cross-linking.

The graft polymer is formed of a backbone of a vinyl pyridine butadiene-styrene terpolymer. Such terpolymers generally contain about 15 percent by weight vinyl pyridine, 70 percent by weight butadiene and 15 percent by weight styrene, although these proportions are not critical to the practice of the invention and can be varied within wide limits.

The amount of one or more of the vinyl chloride, vinylidene chloride or chloroprene monomers grafted onto the terpolymer backbone can be varied within wide ranges. It is generally sufficient that the chlorinated monomer grafted onto the terpolymer provide a total chlorine content of the graft polymer within the range of 1 to 20 percent by weight, and preferably 4 to 12 percent by weight.

The graft polymers used in the practice of this invention can be prepared by reacting one or more of the chlorinated monomers in a vinyl pyridine-butadiene-styrene terpolymer latex in the presence of a free radical catalyst to graft the chlorinated monomer to the terpolymer backbone. Representative of suitable butadiene-styrene-vinyl-pyridine terpolymers include the terpolymers available from the Goodyear Tire and Rubber Company under the trade name "Pliolite VP 100" and a number of terpolymers available from the General Tire and Chemical Company under the trade name "Gentac." For example, use can be made of "Gentac FS" which is a terpolymer having a comparatively low Mooney viscosity within the range of 35–45, although use is preferably made of "Gentac 107" which is a terpolymer having a higher Mooney viscosity.

In addition, suitable graft polymers are commercially available from the General Tire and Chemical Company under the designations 328 AM 3, A 768–130 A, B, C, D, E, F, G and H.

The terpolymer component is generally employed in an amount sufficient to provide from 20–60 percent by weight, and preferably 35–50 percent by weight, of the terpolymer in the treating composition on a solids basis.

The resorcinol-aldehyde component of the composition of this invention contributes materially to the adhesion of the resulting composition to the perfectly smooth, non-porous hydrophilic glass fiber surfaces, and is preferably a resin formed by reaction of the resorcinol with a lower aliphatic aldehyde containing one–three carbon atoms, such as formaldehyde, acetaldehyde and propionaldehyde. Preferred resins for use in the present invention are resorcinol-formaldehyde resins which are formed by the condensation reaction of formaldehyde with resorcinol in a mole ratio of about 2 moles of resorcinol to 1 mole of formaldehyde. Suitable resins are commercially available, for example, Penacolite R2170 from the Koppers Company in the form of a solution containing 75 percent solids. In general, use is preferably made of an amount of resorcinol-aldehyde resin to provide resorcinol-formaldehyde resin solids within the range of 2–10 percent by weight, and preferably within the range of 4–8 percent by weight.

The graft butadiene-styrene-vinyl pyridine terpolymer and the resorcinol-formaldehyde resin are compatible with each other and operate to coat the fibers and fill the interstices between the fibers when applied as an impregnant in a glass fiber bundle whereby the fibers making up the bundle are capable of realignment in the direction of stress for maximizing the high strength properties of the impregnated bundle. These components are also somewhat compatible with the elastomeric materials forming the continuous phase of glass fiber-elastomeric product to thereby permit glass fibers treated in accordance with the present invention to be blended with such elastomeric materials for advancement to a cured or vulcanized stage whereby the treating material from the glass fiber bundles is an integral part of the elastomeric phase to intertie the treated glass fibers to the elastomeric material.

The incompatible wax component of the present invention is preferably a micro-crystalline paraffinic wax of the type described in U.S. Pat. No. 3,567,671, and without limiting the present invention as to theory, it is believed that the wax serves at least a limited function as a rubber softener. The wax is normally employed in an amount in excess of that capable of remaining compatible with the solids makeup of the remainder of the treating composition whereby the wax component sweats out for concentration on the surfaces of the treated glass fibers or glass fiber bundles to provide a non-tacky surface and thereby permit treated glass fibers to be processed into yarns, threads, cords or fabrics, and/or to be wound onto and unwound from spools without scissure or binding notwithstanding the elastomeric component with which the fibers are treated. Thus, the glass fibers can be treated with a composition that enhances good adhesion to the surfaces of glass fibers without interfering with the subsequent processing characteristics of the glass fibers and which also contains the necessary components to facilitate the bonding relationship between the glass fiber surfaces and the elastomeric material in the manufacture of glass-fiber reinforced elastomeric products.

The wax preferred for use in the present invention is a micro-crystalline paraffinic wax having a melting point within the range of 145–150°F and sold under the designation "Vultex Wax Emulsion No. 9" by the General Latex and Chemical Corp. As will be appreciated by those skilled in the art, other paraffinic micro-crystalline waxes having the described characteristics can be employed in the practice of this invention in lieu of or in addition to the Vultex wax specifically described. The amount of the wax component can be varied within the range of 5–25 percent by weight, and preferably 8–20 percent by weight, of the solids of the treating composition.

Having described the basic concepts of the invention, reference is now made to the following examples, which are provided by way of illustration, and not by way of limitation, of the practice of the invention of treating bundles of glass fibers by impregnation or coating individual glass fibers for subsequent use in combination with elastomeric materials in the manufacture of glass fiber-reinforced elastomeric products. As indicated above, in the preferred practice of this invention, previously sized or unsized glass fibers in the form of a strand of a plurality of glass fiber filaments or in the form of a cord composed of strands of glass fibers plied together, with one or more of the strands forming the cord being twisted, are impregnated with the composition of the invention. An impregnating composition representative of the practice of this invention is represented by the following.

EXAMPLE 1

Part A:
  732 parts by wt. deionized water
  1 part by wt. sodium hydroxide
  48 parts by wt. resorcinol-formaldehyde polymer in the form of a latex containing 75% solids (Penacolite R2170)
  16 parts by wt. formalin (37 percent formaldehyde)

Part B:
  900 parts by wt. graft polymer of vinylidene chloride grafted onto vinyl pyridine-butadiene-styrene terpolymer (chloride content 7.3 percent by weight 45 percent by weight solids)
  80 parts by wt. ammonium hydroxide Part C:
  200 parts by wt. water
  15 parts by wt. ammonium hydroxide
  200 parts by wt. micro-crystalline paraffin wax (melting point 145–150°F) Vultex Wax Emulsion No. 9 of General Latex and Chemical Corp. (56 percent solids)

Part A of the foregoing example is separately prepared by combining the ingredients and aging the resulting mixture for about 2–3 hours with the alkali present to adjust the pH to between 7 and 7.5. The remainder of the ingredients are then combined and the various parts are mixed together. However, it will be appreciated that variations in the order of mixing can be carried out to provide a stable system, depending somewhat upon the nature of the components and the relative amounts employed. It has been found that aging of the entire mixture is not essential, although best results are generally obtained when the resulting composition is aged for 10-24 hours or even longer prior to use in impregnating glass fiber bundles.

Impregnation with the aqueous composition prepared in accordance with Example 1 can be carried out by way of any of a variety of known techniques for the impregnation of glass fiber bundles. Referring specifically to FIG. 1 of the drawing, a strand 10 formed of a plurality of glass fibers which have preferably, although not necessarily, been sized as they were being formed, is passed over a guide roller 12 for passage downwardly into an impregnating bath 14 containing the aqueous impregnating composition of Example 1. The bundle is then passed under a pair of rollers 16 to effect a sharp bend in the bundle which operates to open the bundle to facilitate more complete penetration of the aqueous treating composition in the bundle of glass fibers for complete impregnation of the bundle. The impregnated bundle is then raised from the bath for passage through a roller or die 18 which operates to remove excess treating composition from the bundle and to work the treating composition into the bundle. Thereafter, the endless bundle is advanced over roller 20 into a drying oven 22, preferably in the form of an air drying oven maintained at a temperature above ambient temperature, and preferably a temperature within the range of 150–250°F, to accelerate removal of the aqueous diluent and to set the impregnant in situ in the glass fiber bundle. Drying will occur within a relatively short period of time, generally within 1–30 minutes depending upon the temperature of drying.

The resulting bundle is shown in cross-section in FIG. 2 of the drawing. As can be seen from this figure, the bundle is formed of a plurality of glass fibers 40 which have an optional size coating 42 on the surfaces of the individual filaments. The impregnant 44 in the form of the solids from the treating composition of this invention completely penetrates the bundle and serves to separate the glass fibers each from the other to effect a unitary bundle structure.

Additional examples of this concept of the present invention may be illustrated by the following.

EXAMPLE 2

Part A:
  732 parts by wt. distilled water
  1.5 " by wt. sodium hydroxide
  60 parts by wt. resorcinol-formaldehyde resin (75% solids)
  20 parts by wt. formalin Part B:
  900 parts by wt. graft polymer of vinyl chloride grafted onto vinyl pyridine-butadiene-styrene terpolymer (chlorine content 8.7 percent by weight — 47 percent solids)
  80 parts by wt. ammonium hydroxide Part C:
  200 parts by wt. water
  15 parts by wt. ammonium hydroxide
  100 parts by wt. Vultex Wax Emulsion No. 5 (56 percent solids)

EXAMPLE 3

Part A:
  730 parts by wt. distilled water
  1.5 " by wt. tetramethyl ammonium hydroxide
  48 parts by wt. resorcinol-formaldehyde latex (75 percent solids)
  16 parts by wt. formalin
Part B:
  900 parts by wt. graft polymer of chloroprene grafted onto vinly pyridine butadiene-styrene terpolymer (chlorine content 10.3 percent by weight — 48 percent solids)
  80 parts by wt. ammonium hydroxide
  100 parts by wt. water
  100 parts by wt. Vultex Wax Emulsion No. 9 (56 percent solids)

EXAMPLE 4

Part A:
  732 parts by wt. distilled water
  1.5 " by wt. ammonium hydroxide
  48 parts by wt. resorcinol-formaldehyde (75 percent solids)
  16 parts by wt. formalin
Part B:
  900 parts by wt. graft polymer of vinyl chloride and vinylidene chloride (1:1 mole ratio) grafted onto vinyl pyridine-butadiene-styrene terpolymer (chlorine content 10.1 percent by weight — 45 percent solids)
  80 parts by wt. ammonium hydroxide
  50 parts by wt. Vultex Wax Emulsion No. 9 (56 percent solids)

Part A in each of the above examples is separately prepared by combining the ingredients and then aging for about 2–3 hours with alkali present in an amount sufficient to adjust the pH to between 7 and 7.5. The remainder of the ingredients are combined and the various parts are then mixed together. Aging of the entire mixture is not essential but beneficial results accrue, such as greater adhesion and stabilization of the mixture, after aging the entire mixture for from 10–24 hours before use to impregnate the glass fiber bundle.

The foregoing compositions are prepared in accordance with the procedure described in Example 1, and the resulting compositions can be applied by impregnation to glass fiber bundles in accordance with the procedure described in Example 1. In general, the impregnating compositions used in the practice of this invention are diluted with sufficient water to provide a composition having a solids content within the range of 10–50 percent by weight. Application of the impregnating composition can be made in an amount sufficient to impregnant with dry solids of 5–30 percent by weight of the glass fiber bundle, and preferably 10–25 percent by weight. It is desirable to achieve as full impregnation as possible into the bundles of glass fibers to more effectively separate the fibers each from the other with the impregnating material since the solids are effective to cushion the fibers and to protect the fibers from destruction by mutual abrasion. The deeper the penetration, the more effective is the bond between the bundles of glass fibers and the elastomeric material with which the bundles of glass fibers are combined in the subsequent manufacture of glass fiber-elastomeric products.

The elastomeric material with which the impregnated bundle of glass fibers is combined constitutes a continuous phase. The elastomer constituting the continuous phase may be selected from elastomers of the type incorporated into the impregnating composition, or the elastomeric material may differ therefrom. The elastomer constituting a continuous phase can be employed in the cured or uncured stage or in the vulcanized or unvulcanized stage. It is believed that the tie-in between the impregnated bundle of glass fibers and the elastomer constituting the continuous phase occurs primarily during cure or vulcanization of the elastomeric materials in combination with the impregnated bundles.

More complete protection for the individual glass fibers and more complete coordination of the glass fibers with the elastomeric material constituting the continuous phase can be achieved when impregnating compositions of the type described above are modified for use as a size composition for application to individual glass fiber filaments, preferably in forming. For this purpose, treating compositions of the type described above are further diluted with water to provide a solids content within the range of 5–30 percent by weight and are formulated to include a glass fiber anchoring agent. Representative of suitable anchoring agents which can be used in the practice of this invention are the organo silicons, their hydrolysis products and polymerization products (polysiloxane) of an organo silane having the formula:

$Z_{(4-n)}SiR_n$ wherein Z is a readily hydrolyzable group such as alkoxy having one–four carbon atoms (e.g. methoxy, ethoxy, propoxy, etc.) or halogen, such as chlorine, n is an integer from 1 to 3, and R is hydrogen or an organic group in which at least one R group is an alkyl group having one–10 carbon atoms, such as methyl, ethyl, propyl, etc.; alkenyl having one–10 carbon atoms, such as vinyl, allyl, etc.; cycloalkyl having four–eight carbon atoms, such as cyclopentyl, cyclohexyl, etc.; aryl having six–10 carbon atoms, such as phenyl, naphthyl, benzyl, etc.; alkoxy alkyl, such as methyloxyethyl, etc.; alkenylcarbonyloxyalkyl, such as carbonylpropylmethoxy, etc., as well as the amino, epoxy, mercapto and halogen derivatives of the foregoing groups.

Illustrative of suitable silanes are ethyltrichlorosilane, propyltrimethoxy silane, vinyl trichlorosilane, allyl triethoxy silane, cyclohexylethyltrimethoxy silane, phenyltrichloro silane, phenyldimethoxy silane, methacryloxypropyltrimethoxy silane, gamma-aminopropyltriethoxy silane, beta-aminovinyldiethoxy silane, N-(gamma-triethoxysilylpropyl)propylamine, gamma-aminoallyltriethoxy silane, para-aminophenyltriethoxy silane, N-(beta-aminoethyl)-gammaaminopropyltrimethoxy silane, gamma-chloropropyltrichloro silane, glycidoxy propyltrimethoxy silane, 3,4-epoxy-cyclohexylethyltrimethoxy silane, gamma-mercaptopropyltrimethoxy silane, as well as a wide variety of others. It will be understood that the foregoing may be used in the form of the silane, the silanol or the polysiloxane formed by one or more of the foregoing materials.

Instead of organo silicon as described above, use can also be made of Werner complex compounds containing a carboxylato group coordinated with the trivalent nuclear chromic atom, and in which the carboxylato group may also contain an amino group or an epoxy group. Suitable Werner complex compounds include stearato chromic chloride, methacrylato chromic chloride, aminopropylato chromic chloride, glycine chromic complex of glycylato chromic chloride.

The anchoring agents of the type described above are normally employed in an amount within the range of 0.1 to 5% by weight of the treating composition.

A forming size embodying the concepts of this invention can be formulated as follows:

EXAMPLE 5

2 – 10 parts by wt. resorcinol-formaldehyde resin
20 – 60 parts by wt. graft terpolymer
5 – 30 parts by wt. micro-crystalline paraffin wax
0.1–5 parts by wt. anchoring agent

EXAMPLE 6

4 – 8 parts by wt. resorcinol-formaldehyde resin
35 – 50 parts by wt. graft terpolymer
10 – 20 parts by wt. micro-crystalline paraffin wax
0.1–5 parts by wt. anchoring agent The solids of the foregoing examples are formulated in the manner described in Examples 1–4 with the exception that the anchoring agent, such as gamma-aminopropyltriethyoxy silane, is added to the system after hydrolyzation in aqueous medium, as by use of a quaternary ammonium hydroxide such as tetraethanol ammonium hydroxide or tetramethyl ammonium hydroxide and that the amount of water is increased for dilution of the solids to an amount within the range of 5–30 percent by weight. When applied as a size, it is possible to achieve a higher loading of the individual glass fiber surfaces; loading in the amount of 15–40 percent by weight of the sized glass fibers is possible.

The following is a specific example of the formulation to provide a size composition.

EXAMPLE 7

60 parts by wt. resorcinol-formaldehyde resin (75 percent by weight solids)
20 parts by wt. formalin
1.5 " by wt. sodium hydroxide
900 parts by wt. graft terpolymer of Example 1
95 parts by wt. ammonium hydroxide
200 parts by wt. Vultex Wax Emulsion No. 5 (50 percent solids)
7 parts by wt. gamma-aminopropyltriethoxy silane Size compositions of the type illustrated in Examples 5 to 7 can be applied in any of a variety of conventional methods. The resulting fibers are shown in FIG. 4 of the drawing as formed with a coating 42 of the size composition on the surfaces of the individual glass fibers 40.

When the glass fibers are sized in forming with a composition embodying this modification of the invention, the sized glass fibers remain sufficiently non-tacky for processing directly into yarns, strands, cords or fabrics for use in the combination with the continuous phase elastomer.

In fabricating the combinations of glass fibers, treated in accordance with the practice of this invention, with elastomeric materials, the glass fibers or bundles of glass fibers are mixed with the elastomeric material or otherwise laid down in the desired arrangement for combination with the elastomeric material, as in the manufacture of glass fiber-reinforced belts or in the manufacture of rubber tires reinforced with cords of glass fibers. The combinations of glass fibers and elastomeric materials are then processed in a conventional manner by molding and cure under heat and pressure or by vulcanization for advancement of the elastomeric materials to a cured or vulcanized state while in combination with the treated glass fibers whereby the bundles of glass fibers become strongly integrated with the elastomeric material in the glass fiber-elastomeric product.

It will be understood that the size compositions, represented by Examples 5, 6 and 7, may also be employed as impregnating compositions, preferably with a lesser dilution by aqueous medium. The anchoring agent will continue to operate to facilitate the bonded relationship or integration between the elastomeric material of the glass fiber treating composition and the glass fiber surfaces.

It will be apparent from the foregoing that we have provided a new and improved composition for use in the treatment of glass fibers and preferably bundles formed thereof to enhance their utilization with elastomeric materials, even under conditions of high humidity, in the manufacture of glass fiber-elastomeric products while still retaining the desired degree of non-tackiness to enable the treated glass fiber bundle to be processed in substantially the conventional manner into cords, yarns or fabrics or other arrangements desired for use in the final product.

It will be understood that invention exists not only in the compositions described but also in the process in which the compositions are employed in the treatment of glass fibers as well as the treated or impregnated glass fiber products formed thereof.

It will be understood that changes may be made in the details of formulation and methods of preparation without departing from the spirit of the invention, especially as defined in the following claims.

I claim:

1. A composition for the treatment of glass fibers comprising an aqueous system having a solids content of 2 to 10 parts by weight of a resorcinol-aldehyde resin, 20 to 60 parts by weight of a graft polymer formed of a monomer selected from the group consisting of vinyl chloride, vinylidene chloride, chloroprene and combinations thereof grafted onto a vinyl pyridine-butadiene-styrene terpolymer, and 5 to 25 parts by weight of an incompatible wax.

2. A composition as defined in claim 1 wherein the monomer grafted onto the terpolymer is present in an amount sufficient to provide a graft polymer having a chlorine content of 1 to 20 percent by weight.

3. A composition as defined in claim 1 wherein the components are present within the range of 4 to 8 percent by weight of the resorcinol-aldehyde resin, 35 to 50 parts by weight of the graft polymer and 8 to 20 percent by weight of the wax.

4. A composition as defined in claim 1 which includes from 1 to 5 parts by weight of an anchoring agent.

5. A glass fiber bundle comprising a plurality of glass fibers and an impregnant in the bundle, said impregnant comprising 2 to 10 parts by weight of a resorcinol-aldehyde resin, 20 to 60 parts by weight of a graft polymer formed of a monomer selected from the group consisting of vinyl chloride, vinylidene chloride, chloroprene and combinations thereof grafted onto a vinyl pyridine-butadiene-styrene terpolymer, and 5 to 25 parts by weight of an incompatible wax.

6. A glass fiber bundle as defined in claim 5 wherein the monomer grafted onto the terpolymer is present in an amount sufficient to provide a graft polymer having a chlorine content of 1 to 20 percent by weight.

7. A glass fiber bundle as defined in claim 5 wherein the impregnant includes 0.1 to 5 parts by weight of an anchoring agent.

8. A glass fiber bundle as defined in claim 5 wherein the impregnant constitutes from 5 to 30 percent by weight of the glass fiber bundle.

9. A glass fiber bundle as defined in claim 5 wherein the individual glass fibers forming the bundle have a thin size coating on the individual surfaces thereof.

10. A glass fiber bundle as defined in claim 5 wherein the bundle is in the form of a strand of glass fibers.

11. A glass fiber bundle as defined in claim 5 wherein the bundle is in the form of two or more strands of glass fibers plied together.

12. A glass fiber bundle as defined in claim 11 wherein the strands are plied and twisted together.

13. Glass fibers having a thin coating thereon, said coating comprising 2 to 10 parts by weight of a resorcinolaldehyde resin, 20 to 60 parts by weight of a graft polymer formed of a monomer selected from the group consisting of vinyl chloride, vinylidene chloride, chloroprene and combinations thereof grafted onto a vinyl pyridine-butadiene-styrene terpolymer, and 5 to 25 parts by weight of an incompatible wax.

14. Glass fibers as defined in claim 13 wherein the monomer grafted onto the terpolymer is present in an amount sufficient to provide a graft polymer having a chlorine content of 1 to 20 percent by weight.

15. Glass fibers as defined in claim 13 wherein the coating includes 0.1 to 5 parts by weight of an anchoring agent.

16. In a glass fiber-reinforced elastomeric product in which an elastomeric material constitutes a continuous phase in which glass fibers are distributed, the improvement in the bonding relationship of the glass fibers with the elastomeric material comprising a coating on the glass fibers comprising 2 to 10 parts by weight of a resorcinol-aldehyde resin, 20 to 60 parts by weight of a graft polymer formed of a monomer selected from the group consisting of vinyl chloride, vinylidene chloride, chloroprene and combinations thereof grafted onto a vinyl pyridine-butadiene-styrene terpolymer, and 5 to 25 parts by weight of an incompatible wax.

17. An elastomeric product as defined in claim 16 wherein the monomer grafted onto the terpolymer is present in an amount sufficient to provide a graft polymer having a chlorine content of 1 to 20 percent by weight.

18. An elastomeric product as defined in claim 16 wherein the coating includes an anchoring agent.

19. An elastomeric product as defined in claim 16 wherein the glass fibers are distributed in the elastomeric material in the form of individual filaments and the coating is a coating on the filaments.

20. An elastomeric product as defined in claim 16 wherein the glass fibers are distributed in the elastomeric material in the form of bundles of glass fibers and the coating is an impregnant in the bundle.

21. An elastomeric product as defined in claim 20 wherein the individual fibers forming the bundles contain a size coating on the surfaces thereof.

22. An elastomeric product as defined in claim 20 wherein the fiber bundle is in the form of a cord formed of a plurality of strands of glass fibers.

23. An elastomeric product as defined in claim 22 wherein the strands forming the cords are twisted and plied together.

* * * * *